March 25, 1941.   F. A. YOUNG   2,236,255
CONTROL UNIT
Filed Feb. 15, 1938   2 Sheets-Sheet 1
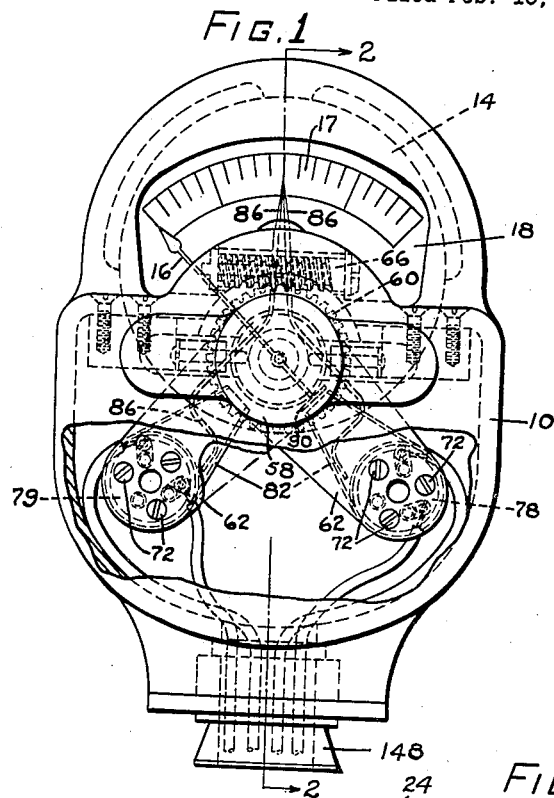
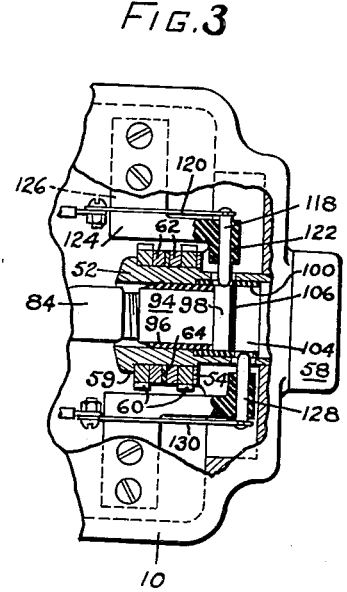
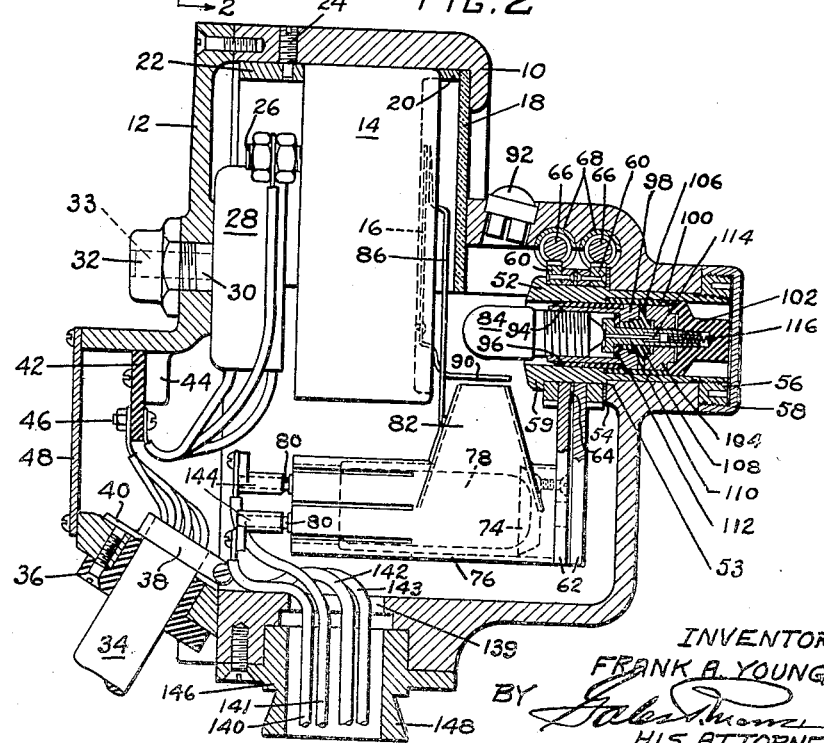
INVENTOR:
FRANK A. YOUNG,
BY
HIS ATTORNEY.

March 25, 1941.  F. A. YOUNG  2,236,255
CONTROL UNIT
Filed Feb. 15, 1938  2 Sheets-Sheet 2

INVENTOR:
FRANK A. YOUNG,
BY
HIS ATTORNEY.

Patented Mar. 25, 1941

2,236,255

UNITED STATES PATENT OFFICE 2,236,255

CONTROL UNIT

Frank A. Young, Meriden, Conn., assignor to General Motors Corporation, Detroit, Mich., a corporation of Delaware Application February 15, 1938, Serial No. 190,548

12 Claims. (Cl. 250—41.5)

This invention relates to control units and comprises all of the features of novelty herein disclosed. An object of the invention is to provide means to control the operations of a mechanism or machine from an indicator such as a work gauge. In the illustrated construction, a gauge such as disclosed in my copending application Serial No. 129,885, filed March 9, 1937, is utilized to produce an amplified movement of a pointer on a meter. The pointer 16 in the present invention carries a shutter 90 which successively influences two light sensitive elements, such as the photoelectric cells 78 and 79, and the current from these light sensitive elements is amplified to control the relays L1 and L2 which in turn cause machine operations to occur or cease as desired. Another object is to provide a control unit of this character which can be attached to any suitable machine to control operation thereof.

To these ends, and also to improve generally upon devices of the character indicated, the invention consists in the various matters hereinafter described and claimed.

In the accompanying drawings:

Fig. 1 is a front elevation of one portion of the unit which is partly broken away to better illustrate the mechanism;

Fig. 2 is a vertical view chiefly in section on the line 2—2 of Fig. 1 and looking in the direction of the arrows;

Fig. 3 is a view of a portion of the mechanism of Figs. 1 and 2, the housing being broken away and certain parts associated with the lamp being in section;

Figure 4:
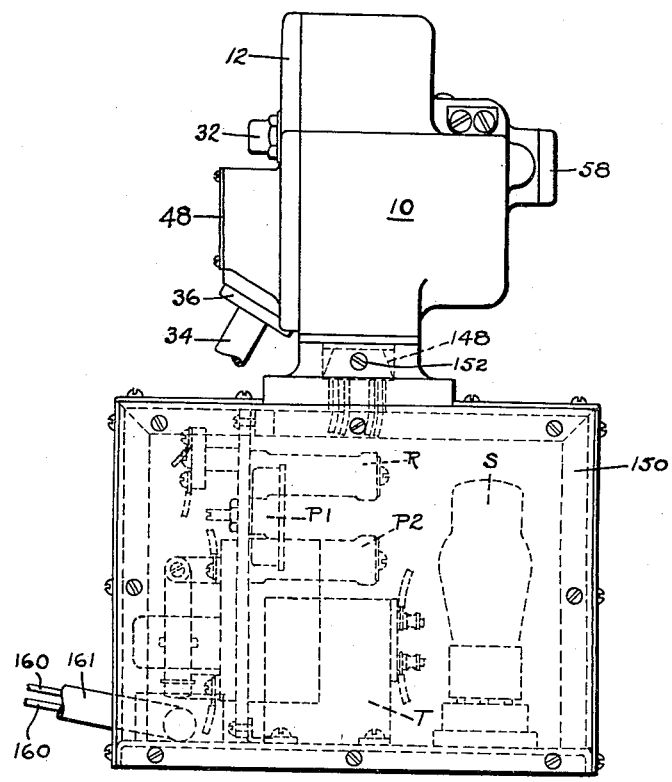
Fig. 4 is a side elevation of the entire unit.

The numeral 10 indicates a housing having a detachable cover 12. A meter 14, having a pointer 16 movable over a scale 17, is mounted in the upper portion of the housing which surrounds the meter for more than 180°, there being a window 18 to expose the pointer and an arcuate spacer 20 between the window and the meter. An arcuate binding member 22 is secured in the housing at the rear of the meter by the screws 24. The meter has binding posts 26. A potentiometer 28 is secured to the cover 12 by a threaded sleeve 30 and a clamping nut 32, the adjustable arm of the potentiometer being controlled through a screw 33 in the sleeve for presetting the pointer 16. An insulating cable 34 containing the supply wires enters the housing through a flanged insulating sleeve 36 fastened to the cover by screws. Around the end of the cable is clamped a split clamping member 38 having a lug 40 secured to the inner wall of the cover. An insulating panel 42 is secured to the lugs 44 on the cover by screws and has a series of binding posts 46. These posts and the corresponding wires are accessible through an opening which is closed by a removable plate 48. The meter 14 is electrically controlled from a work gauge which rides on a work-piece during machining or other size changing treatment and the electric control and the gauge may be similar to that disclosed in my before-mentioned copending application. The scale 17 is preferably graduated in desired units so that the movement of the pointer 16 thereover will directly indicate the variation of work size.

The front of the housing has a projecting boss to receive a hollow stud or sleeve 52 having an intermediate shoulder 53 clamped against the inner face of the housing by a ring nut 56 threaded on the outer reduced end of the stud and engaging the outer face of the housing. A flanged cover 58 is threaded on the nut. Mounted to turn on the stud 52 between a washer 54 and a shoulder 59 are two worm wheels 60, each having an arm 62 pinned to it with a spacing washer 64 between the arms. Each worm wheel is individually operable by means of a worm 66 journalled in a bushing 68 and having a screw head outside the housing for adjustment by a screw driver. Each arm 62 is secured by screws 72 to a plate 74 which forms part of a carrier sleeve 76 for a photoelectric cell having terminals 80. In the present showing, there are two photoelectric cells 78 and 79. Each sleeve is provided with a funnel shaped hood 82 projecting radially towards the axis of the stud 52 in which a lamp 84 is mounted. Thus the light rays are directed into the hood towards the active part of the photoelectric cell in any position of angular adjustment of the swinging arms 62. Each hood carries a pointer 86 adjustable over the scale 17 for the pointer 16, but the pointers 86 are normally stationary. The pointer 16 of the meter 14 carries a shield or shutter 90 adapted to intercept the light rays directed into the hoods 82 by the lamp. As the pointer 16 swings, as in response to measurement of a work-piece, the shutter 90 will first intercept the light to one photoelectric cell after which it will permit illumination of both photoelectric cells, and, after a still further angular movement, will intercept the light to the other cell. Hence, the light to the photoelectric cells will be greatly reduced or completely cut off at predetermined positions of the pointer 16. The photoelectric cells are arranged to control electric circuits in response to variations in the amount of light directed onto the cells as will be later described. A bull's-eye 92 set in an opening of the housing tells when the lamp 84 is lighted.

The lamp 84 is screwed into a threaded socket 94 insulated from the stud 52 by an insulating sleeve 96, the apertured base 98 of the lamp socket being further insulated from the stud by an insulating sleeve 100 carried in a counterbore of the stud and engaging at its front end with an insulating plug 102. Fitting within the sleeve 100 is a conductor ring 104 insulated from the base 98 by a flange 106 on a hollow insulating plug 108 which is bored for passage of a hollow screw 110 threaded in the conductor ring 104 and in the insulating plug 102. The head of the hollow screw bears against an insulating washer 112 which engages the lamp socket base 98 and an extension of the plug 108. A contact plunger 114 slides in the hollow screw and is urged against the center contact of the lamp 84 by a coil spring 116 which abuts against a collar on the plunger and against the bottom of the threaded recess of the plug 102. The lamp and socket assembly is removable as a unit from the stud 52 upon taking off the cover 58.

As indicated in Fig. 3, the stud 52 and the insulating sleeve 100 have registering slots on opposite sides, one pair of slots admitting a conducting pin 118 which supplies current to the lamp socket base 98 from a conductor spring 120. The pin 118 slides in a lug 122 on an arm 124 of a bracket 126 of insulating material secured by screws to the housing. The other pair of registering slots admit a conductor pin 128 which supplies current from a conductor spring 130 to the conductor ring 104 and thence to the center contact of the lamp. This pin 128 is mounted in the same manner as the pin 118. The slots in the stud 52 are of such size that the pins 118 and 128 do not electrically contact this stud.

The housing 10 has an opening 139 for two sets of wires 140, 141 and 142, 143 secured by the slip terminals 144 to the terminals 80 of the respective photoelectric cells 78 and 79. A flanged sleeve 146 is secured to the housing by screws and has a swivelling projection 148 adapted to swivel in a socket at the top of an apparatus box 150. A screw 152 serves to clamp the projection and the housing 10 in any selected angular position on the box 150.

The photoelectric cells are preferably connected in opposed relation and the amount of current flow through these photoelectric cells varies in response to the amount of light engaging the cells from the lamp 84 under control of the shutter 90. This current flow is suitably amplified to operate the power switches L1 and L2 through a relay herein illustrated as a thermionic vacuum valve V having a filament $f$, a grid $g$, and a plate $p$. These switches control the power circuits A and B suitably connected in any well known manner to operate and control a machine tool or other mechanism in response to variations of work size. In the present instance, the switches may be of the magnetic relay type arranged to lie in open circuit positions whenever their respective magnet coils are in open circuit.

Figure 5:
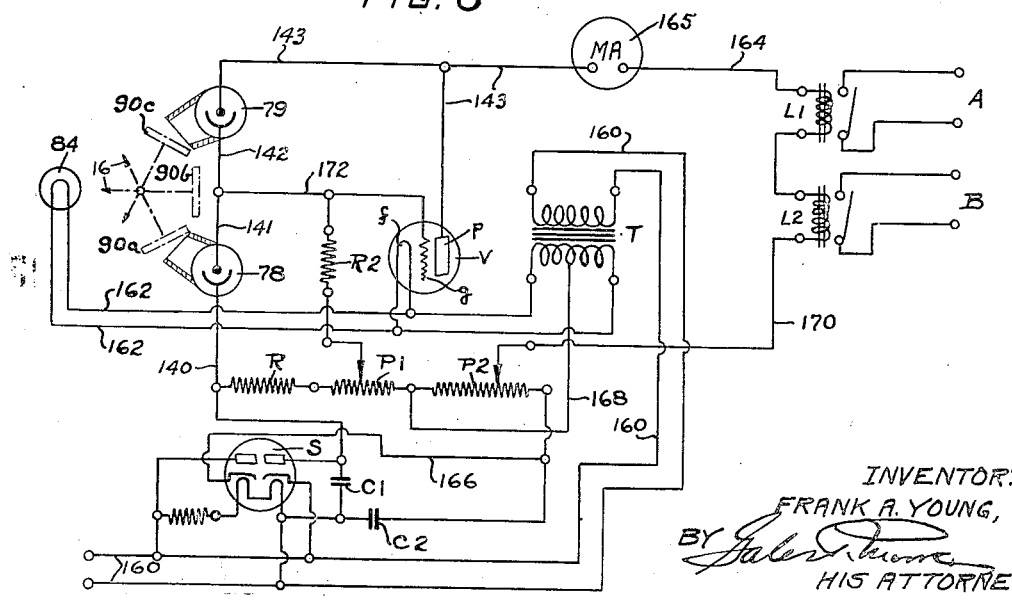
Fig. 5 is a diagram of the electrical connections.

One circuit which has been found successful is diagrammatically illustrated in Fig. 5 of the drawings. Line wires 160 protected by a cable 161 connect with a suitable supply such as a 110 volt alternating current source connected with the primary of a transformer T having a secondary connected through wires 162 to the filament $f$ and the lamp 84. The anode of the cell 78 connects with the cathode of the cell 79 by the wires 141 and 142, and the anode of the cell 79 connects through the wire 143 with the plate $p$ and a current indicator such as a milliammeter 165 which in turn is connected to the switch L1 by a wire 164. A standard type of full wave rectifier S arranged to impress a direct current flow through the photoelectric cells, has filaments connected across the line 160. One of the plates of the rectifier is connected through the wire 140 to the cathode of the photoelectric cell 78 and to one end of a resistor R. A condenser C1 is bridged between the rectifier plate and the rectifier filament. The other end of the resistor R connects with a potentiometer P1 connected to a second potentiometer P2 which in turn is connected through a wire 166 to a cathode of the rectifier, and a condenser C2 is bridged between this cathode and the rectifier filament. The remaining rectifier cathode and plate are connected to one side of the line 160. The inter-connected ends of the potentiometers are connected by a wire 168 to a center tap of the secondary of the transformer T, and the adjustable member of the potentiometer P2 connects through a wire 170 with the magnetic switch L2 the other side of which is connected to the magnetic switch L1. The grid $g$ is connected by a wire 172 to the wires 141 and 142 and also to a grid resistor R2, the other end of which connects with the adjustable member of the potentiometer P1 as shown.

It is well known that if a positive potential is applied to the grid of a thermionic vacuum valve by an external electromotive force, electrons will flow from the filament to the plate, resulting in a current flow through the plate circuit proportional to the applied positive grid bias. This current flow in the plate circuit will be completely cut off when the grid potential is of a predetermined negative value.

In the operation of my device, a suitable work gauge such, for example, as that disclosed in my copending application, Serial No. 129,885, filed March 9, 1937, is brought into contact with a work piece mounted in a suitable machine tool such as a grinding machine arranged to change the work size. The potentiometer 28 is adjusted to preset the pointer 16 of the meter 14 at a desired initial position and the pointers 86 are selectively positioned on the scale 17 with respect to the initial setting of the pointer 16 so that the movement of the shutter 90 to predetermined positions will affect the circuits A and B when the pointer 16 indicates predetermined work sizes. The pointer 16 preferably starts from an initial scale position such as that indicated in Fig. 1 wherein the shutter 90 assumes the initial position 90a of Fig. 5, cutting off the flow of light to the photoelectric cell 78. At this time light from the lamp 84 falls on the cell 79, and the current from the rectifier S flows through the cell 79 to effect a maximum positive grid potential in the valve V, thereby producing sufficient current flow in the plate circuit to close both the switches L1 and L2 and close the circuits A and B.

When the pointer indicates a second predetermined work size on the scale 17, the shutter reaches the intermediate position 90b wherein both the photoelectric cells are under the influence of the lamp 84 and act in opposition to each other. This opposition may be of such extent as to reduce the current flow through the cells, or, if preferred, it may be great enough to completely cut off the current flow. In the present instance, the opposition of the photoelectric cells is of unbalanced characteristics so that the grid potential is sufficiently reduced to effect a lesser current flow through the plate circuit, and this results in one of the magnetic switches remaining closed and the other assuming an open circuit position.

As the pointer 16 continues its movement in response to further reduction in work size, the shutter finally assumes the position 90c and the light is cut off from the photoelectric cell 79. At this time the current flow through the photoelectric cell 78 results in a sufficiently negative grid potential to completely cut off the current flow through the plate circuit resulting in both the switches L1 and L2 assuming open circuit positions. When the gauge is applied upon the next work piece, the pointer 16 returns to its starting position, closing switches L1 and L2, and the cycle is repeated.

In one application of my invention to a grinding machine, such, for example, as the machine disclosed in the United States Patent Number 1,923,762 issued to Stevens on August 22, 1923, the switches L1 and L2 are respectively connected to control the fast feeding mechanism and to control the slow feed mechanism for feeding the grinding wheel towards and into a work piece. When the shutter is in its initial position 90a both feeds co-operate to quickly move the grinding wheel from a remote position into work engagement and to produce a fast rough grinding operation. When the work is ground to a predetermined size which is near the final required size, the shutter reaches its intermediate position 90b and the opposed relation of the photoelectric cells acts through the valve V to open the switch L1 while leaving the switch L2 closed, and to thus produce a finish grinding operation at a slower speed. When the work reaches the final desired size, the shutter reaches position 90c and the switch L2 is opened to stop the grinding wheel feed. It will be appreciated that the meter 14 may be reversely connected by interchanging the wires to the binding posts 26 so that the pointer 16 may be arranged to swing in a progressive path over the scale 17 in either direction dependent upon the sequence of control desired for the power circuits A and B.

I claim:

1. In a device of the character indicated, a light sensitive element, a source of light therefor, an electric circuit controlled by the element, a movable member for changing the intensity of light received by said element at a predetermined position of its movement, and adjustable means to relatively position the light source and said element to locate said predetermined position; substantially as described.

2. In a device of the character indicated, a plurality of electric circuits, a plurality of light sensitive elements respectively controlling said circuits, a single source of light in fixed relation to both of said elements, a movable measuring member, means responsive to a progressive movement of said member for sequentially changing the intensity of light received by said elements, and means to individually and adjustably locate each of the successive positions of said member at which the light intensity is changed; substantially as described.

3. In a device of the character indicated, a plurality of electric circuits, a plurality of light sensitive elements respectively controlling said circuits, a single fixed source of light for the elements, a member movable through a progressive path for sequentially changing the intensity of light received by the elements, and means to individually adjust each of the positions of said elements while maintaining said elements at the same distance from the light source; substantially as described.

4. In a device of the character indicated, a light sensitive element, a light source therefor, an electric circuit controlled by the element, a movable indicator, a shutter responsive to the indicator movement for changing the light intensity received by the element when the indicator reaches a predetermined position of its movement, and means to adjust the element relative to said light source for locating said predetermined position; substantially as described.

5. In a device of the character indicated, a light sensitive element, a fixed source of light therefor, an electric circuit controlled by the element, a movable measuring member, means responsive to said member for changing the light intensity received by said element when said member moves through a predetermined position, means to adjust the element relative to the light source for locating said predetermined position, and means indicating the position of said adjustment; substantially as described.

6. In a device of the character indicated, a light sensitive element, an electric circuit controlled thereby, a fixed light source, a pointer, means supporting the pointer for movement, a graduated scale associated with the pointer, a shutter on the pointer for changing the light intensity received by said element when the pointer reaches a predetermined scale reading, means to adjustably position the element with respect to the light source, and a second pointer movable over said scale to indicate the adjusted position of the element; substantially as described.

7. In a device of the character indicated, a light sensitive element, a fixed source of light therefor, an electric circuit controlled by the element, a movable member having a shutter portion for changing the intensity of the light received by said element when the member reaches a predetermined position in its movement, an angularly movable arm supporting said element for swinging movement relative to said light source and to said shutter, and means to adjustably position said arm; substantially as described.

8. In a device of the character indicated, a sleeve, a lamp immovably supported by said sleeve, an arm journalled on the sleeve for swinging movement about said lamp, a light sensitive element carried by the arm, means to angularly position said arm, and a member movable between the lamp and the element; substantially as described.

9. In a device of the character indicated, a light source, a light sensitive element, a shutter movable between the element and said light source, an arm carrying the element, means rotatably supporting the arm for movement about the light source, and gear mechanism for angularly positioning said arm about the light source; substantially as described.

10. In a device of the character indicated, a sleeve, a light source supported by the sleeve, a light sensitive element, an arm journalled on said sleeve and carrying said element for movement relative to the light source, a worm wheel secured to the arm, and a worm meshed with said wheel for angularly locating the arm; substantially as described.

11. In a device of the character indicated, a sleeve, a light source removably supported by the sleeve, an arm journalled on the sleeve, a light sensitive element carried by the arm and arranged to control an electric circuit, a movable measuring member having a shutter portion movable between said element and the light source to affect changes in light intensity received by said element, a worm wheel surrounding the sleeve and connected to the arm, and a manually operable worm meshed with said wheel for angularly positioning the arm; substantially as described.

12. In a control unit, a housing, a meter in the housing having a movable measuring member, a sleeve mounted in the housing, a lamp socket removably secured in the sleeve, a lamp projecting into the housing from said socket, a plurality of arms journalled on the sleeve, a plurality of light sensitive elements respectively secured to said arms, a shutter operated by the measuring member and movable between the lamp and the elements for selectively changing the light intensity received by the elements when said member reaches predetermined positions of its movement, a worm wheel secured to each arm, and manually operable worms meshed with said wheels for individually positioning said elements; substantially as described.

FRANK A. YOUNG.